US012687058B2

(12) United States Patent
Bodell

(10) Patent No.: US 12,687,058 B2
(45) Date of Patent: Jul. 21, 2026

(54) CABLE-LESS END GATE FOR A VEHICLE

(71) Applicant: GM GLOBAL TECHNOLOGY OPERATIONS LLC, Detroit, MI (US)

(72) Inventor: Scott Lee Bodell, Lapeer, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 406 days.

(21) Appl. No.: 18/362,038

(22) Filed: Jul. 31, 2023

(65) Prior Publication Data

US 2025/0043605 A1      Feb. 6, 2025

(51) Int. Cl.
| | |
|---|---|
| *E05D 11/10* | (2006.01) |
| *B62D 33/027* | (2006.01) |
| *B62D 33/03* | (2006.01) |
| *E05D 3/02* | (2006.01) |
| *E05D 11/06* | (2006.01) |

(52) U.S. Cl.
CPC ...... *E05D 11/1057* (2013.01); *B62D 33/0273* (2013.01); *B62D 33/03* (2013.01); *E05D 3/02* (2013.01); *E05D 11/06* (2013.01); *E05Y 2201/638* (2013.01); *E05Y 2800/75* (2013.01); *E05Y 2900/544* (2013.01)

(58) Field of Classification Search
CPC . B62D 33/0273; B62D 33/03; E05D 11/1057; E05D 11/06; E05D 3/02; E05Y 2201/638942; E05Y 2201/638; E05Y 2800/75; E05Y 2900/544942
USPC ...................................................... 296/183.1
See application file for complete search history.

(56) References Cited

U.S. PATENT DOCUMENTS

| | | | | |
|---|---|---|---|---|
| 1,634,224 | A | * | 6/1927 | Wenzel .............. B62D 33/0273 |
| | | | | 296/57.1 |
| 4,976,474 | A | * | 12/1990 | Doty ....................... B60R 22/44 |
| | | | | 242/385.3 |
| 6,769,729 | B1 | | 8/2004 | Bruford et al. |
| 7,699,378 | B2 | | 4/2010 | Smith et al. |
| 2010/0084885 | A1 | | 4/2010 | Townson et al. |
| 2017/0166265 | A1 | * | 6/2017 | Estrada ................ B62D 33/037 |
| 2018/0290693 | A1 | | 10/2018 | Ogden et al. |
| 2021/0016844 | A1 | * | 1/2021 | Ogden ................. B62D 33/037 |
| 2022/0178191 | A1 | * | 6/2022 | Hammond .............. F16D 41/02 |

(Continued)

OTHER PUBLICATIONS

German Office Action for German Application No. 102023128166. 6; dated Dec. 2, 2024; 7 pages.

*Primary Examiner* — Amy R Weisberg
*Assistant Examiner* — Daniel R Digiovannantonio
(74) *Attorney, Agent, or Firm* — CANTOR COLBURN LLP

(57) ABSTRACT

A cargo box for a pickup truck includes a base portion including a first end, a second end, and an intermediate portion defining the cargo box, a first side wall extending from the first end towards the second end on a first side of the cargo box, the first side wall including a first end portion and a second side wall extending from the first end towards the second end, the second side wall including a second end portion. The cargo box also includes an end gate being pivotally mounted at the second end of the base portion by a pair of adjustable hinges, the end gate being disposed in one of a closed position, a first intermediate position, and a fully open position. The pair of adjustable hinges are configured to selectively retain the end gate in one of the first intermediate position and the fully open position.

20 Claims, 6 Drawing Sheets

(56) References Cited

U.S. PATENT DOCUMENTS

2023/0287714 A1* 9/2023 Rosales .................... E05B 81/34
2024/0051437 A1* 2/2024 Kim ...................... B60N 2/2352
2024/0174138 A1* 5/2024 Lim ...................... B60N 2/3004
2025/0019012 A1* 1/2025 Grable ................. B62D 33/037

* cited by examiner

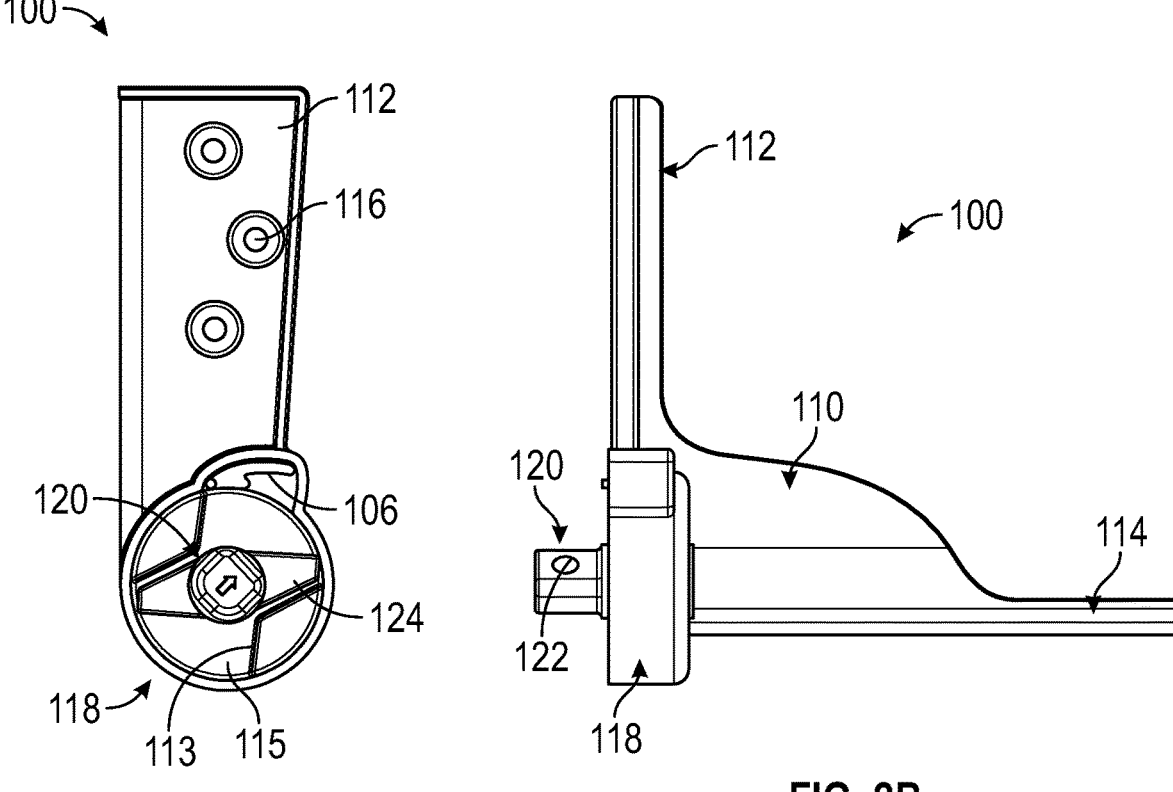
FIG. 2A
FIG. 2B
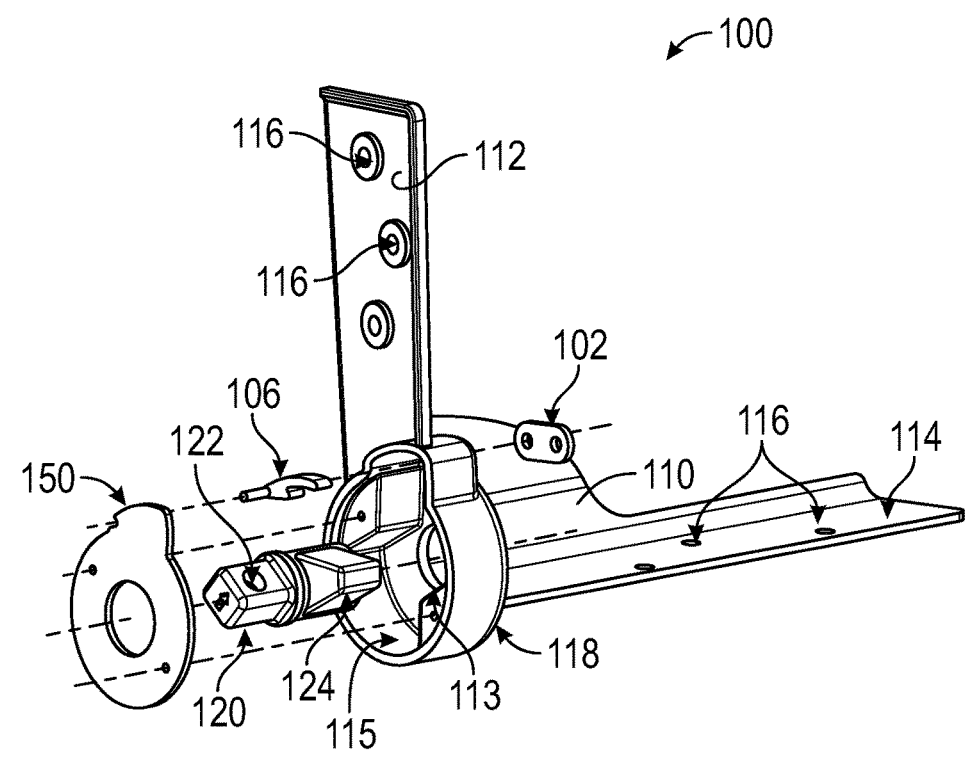
FIG. 2C

CABLE-LESS END GATE FOR A VEHICLE

INTRODUCTION

Exemplary embodiments relate to the art of vehicles and, more particularly, to a cable-less end gate for a pickup truck box.

Many vehicles, such as pickup trucks, include a cargo box that is utilized to transport various goods, tools, materials, and the like. The cargo box includes an end gate that can be opened and closed to selectively provide access to the cargo box. Traditionally, the end gate is pivotally mounted to the cargo box and secured to the cargo box using cables that limit the range of motion of the end gate. These end gates are only configured to be used in one of a closed and open position.

SUMMARY

In one exemplary embodiment a cargo box for a pickup truck is provided. The cargo box includes a base portion including a first end, a second end, and an intermediate portion defining the cargo box, a first side wall extending from the first end towards the second end on a first side of the cargo box, the first side wall including a first end portion, and a second side wall extending from the first end towards the second end on a second side of the cargo box, the second side wall including a second end portion. The cargo box also includes an end gate having first side portion, a second side portion, a surface extending between the first and second side portions, and an end portion, the end gate being pivotally mounted at the second end of the base portion by a pair of adjustable hinges, the end gate being disposed in one of a closed position wherein the end gate is linked to the first and second side walls, a first intermediate position wherein the end gate is arranged at a first angle relative to the base portion, and a fully open position wherein the end gate is arranged at a second angle, greater than the first angle, relative to the base portion. The pair of adjustable hinges are configured to selectively retain the end gate in one of the first intermediate position and the fully open position.

In addition to one or more of the features described herein the end gate is further capable of being disposed in a second intermediate position wherein the end gate is arranged at a third angle, greater than the first angle and less than the second angle, relative to the base portion.

In addition to one or more of the features described herein the cargo box also includes a release activation configured to permit the end gate to transition from the closed position directly to the fully open position.

In addition to one or more of the features described herein the release activation is further configured to permit the end gate to transition from the first intermediate position to either the closed position or the fully open position In addition to one or more of the features described herein the release activation is an end gate handle disposed on second surface of the end gate.

In addition to one or more of the features described herein the release activation is a button disposed on one of the first side wall and the second side wall.

In addition to one or more of the features described herein in the fully open position an angle between the base portion of the cargo box and the first surface of the end gate is approximately one hundred and seventy-seven degrees, in the closed position the angle between the base portion of the cargo box and the first surface of the end gate is approximately ninety degrees, in the first intermediate position the angle between the base portion of the cargo box and the first surface of the end gate is approximately one hundred and fifty degrees, and in the second intermediate position the angle between the base portion of the cargo box and the first surface of the end gate is approximately one hundred and twenty degrees.

In addition to one or more of the features described herein each of the pair of adjustable hinges includes a hinge pin that is affixed to one of the first side wall and the second side wall, a positioning cam affixed to the hinge pin and a pawl configured to selectively engage with the positioning cam.

In addition to one or more of the features described herein the cargo box also includes a release activation configured to selectively engage the pawl with the positioning cam.

In addition to one or more of the features described herein each of the pair of adjustable hinges further includes a control disc configured to prevent the pawl from engaging the positioning cam while the end gate transitions from the closed position to the fully open position.

In another exemplary embodiment a vehicle having a body and a cargo box mechanically connected to the body is provided. The cargo box includes a base portion including a first end, a second end, and an intermediate portion defining the cargo box, a first side wall extending from the first end towards the second end on a first side of the cargo box, the first side wall including a first end portion, and a second side wall extending from the first end towards the second end on a second side of the cargo box, the second side wall including a second end portion. The cargo box also includes an end gate having first side portion, a second side portion, a surface extending between the first and second side portions, and an end portion, the end gate being pivotally mounted at the second end of the base portion by a pair of adjustable hinges, the end gate being disposed in one of a closed position wherein the end gate is linked to the first and second side walls, a first intermediate position wherein the end gate is arranged at a first angle relative to the base portion, and a fully open position wherein the end gate is arranged at a second angle, greater than the first angle, relative to the base portion. The pair of adjustable hinges are configured to selectively retain the end gate in one of the first intermediate position and the fully open position.

In addition to one or more of the features described herein the end gate is further capable of being disposed in a second intermediate position wherein the end gate is arranged at a third angle, greater than the first angle and less than the second angle, relative to the base portion.

In addition to one or more of the features described herein the cargo box also includes a release activation configured to permit the end gate to transition from the closed position directly to the fully open position.

In addition to one or more of the features described herein the release activation is further configured to permit the end gate to transition from the first intermediate position to either the closed position or the fully open position.

In addition to one or more of the features described herein the release activation is an end gate handle disposed on second surface of the end gate.

In addition to one or more of the features described herein the release activation is a button disposed on one of the first side wall and the second side wall.

In addition to one or more of the features described herein in the fully open position an angle between the base portion of the cargo box and the first surface of the end gate is approximately one hundred and seventy-seven degrees, in the closed position the angle between the base portion of the cargo box and the first surface of the end gate is approximately ninety degrees, in the first intermediate position the angle between the base portion of the cargo box and the first surface of the end gate is approximately one hundred and fifty degrees, and in the second intermediate position the angle between the base portion of the cargo box and the first surface of the end gate is approximately one hundred and twenty degrees.

In addition to one or more of the features described herein each of the pair of adjustable hinges includes a hinge pin that is affixed to one of the first side wall and the second side wall, a positioning cam affixed to the hinge pin and a pawl configured to selectively engage with the positioning cam.

In addition to one or more of the features described herein the cargo box also includes a release activation configured to selectively engage the pawl with the positioning cam.

In addition to one or more of the features described herein each of the pair of adjustable hinges further includes a control disc configured to prevent the pawl from engaging the positioning cam while the end gate transitions from the closed position to the fully open position.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which:

FIGS. 2A and 2B are side views of an example hinge assembly in accordance with an exemplary embodiment;

FIG. 2C is a disassembled view of an example hinge assembly in accordance with an exemplary embodiment;

DETAILED DESCRIPTION

Figure 1A:
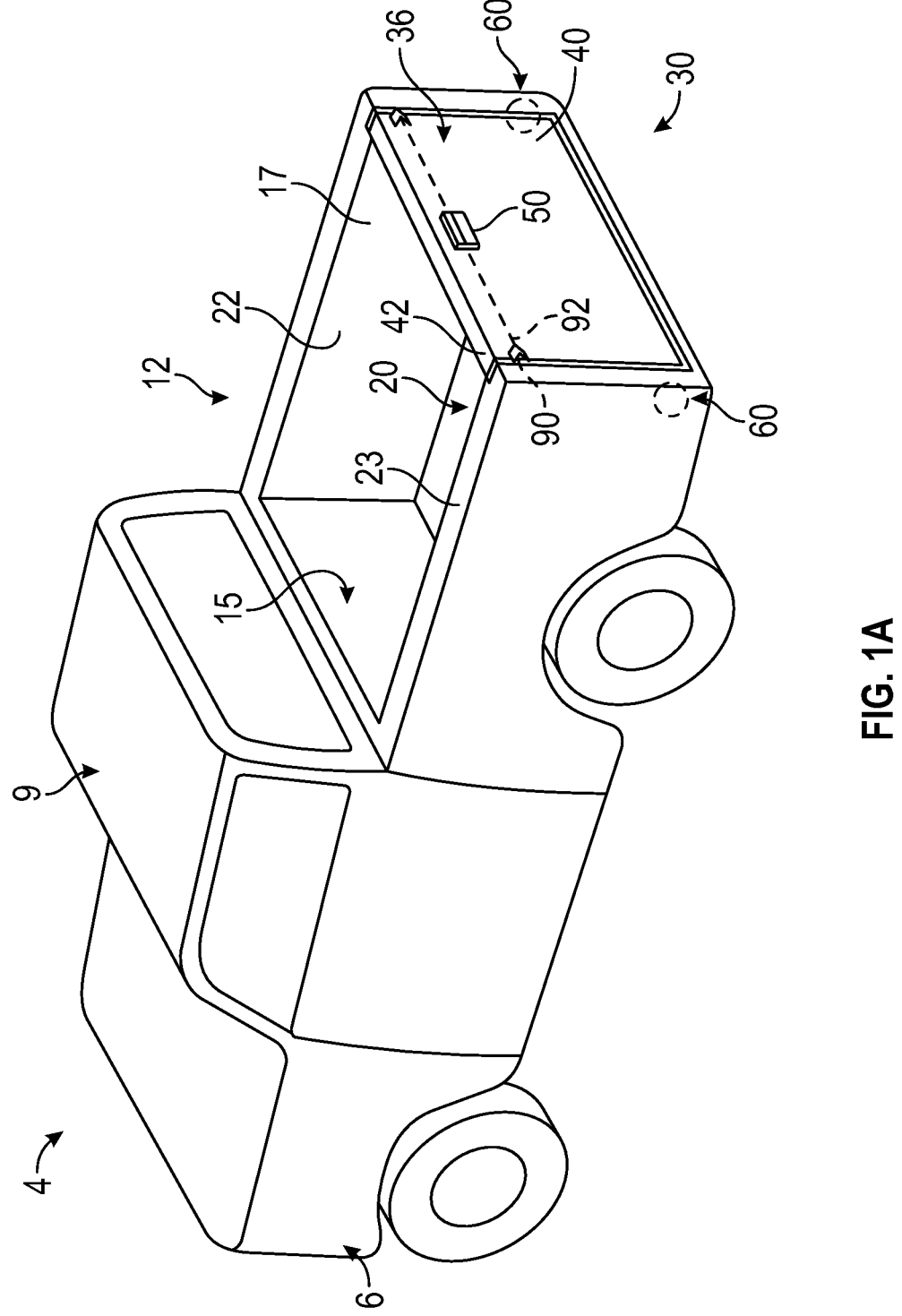
FIG. 1A is a perspective view of a vehicle having an end gate depicted in a closed configuration, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, a cable-less end gate for a cargo box of a vehicle is provided. The cable-less end gate is pivotally mounted to the cargo box of a vehicle, such as a pickup truck, via a hinge assembly that controls the relative position of the end gate to the cargo box. Notably, the hinge assembly is configured to selectively secure the end gate into one of multiple positions relative to the cargo box without the use of a cable. In addition, the hinge assembly permits the end gate to be securely placed into intermediate positions between the fully open and closed positions.

In one embodiment, the hinge assembly is configured to permit the transition of the end gate from a closed position directly to a fully open position, without stopping at any intermediate positions between the closed and the fully open positions. In addition, the hinge assembly is configured to permit the transition of the end gate from the closed position to one of a first intermediate position, a second intermediate position, and the closed position. Furthermore, the hinge assembly is configured to permit the transition of the end gate from the first intermediate position to one of the second intermediate position, the fully open position, and the closed position. Likewise, the hinge assembly is configured to permit the transition of the end gate from the second intermediate position to one of the first intermediate position, the fully open position, and the closed position.

Figure 1B:
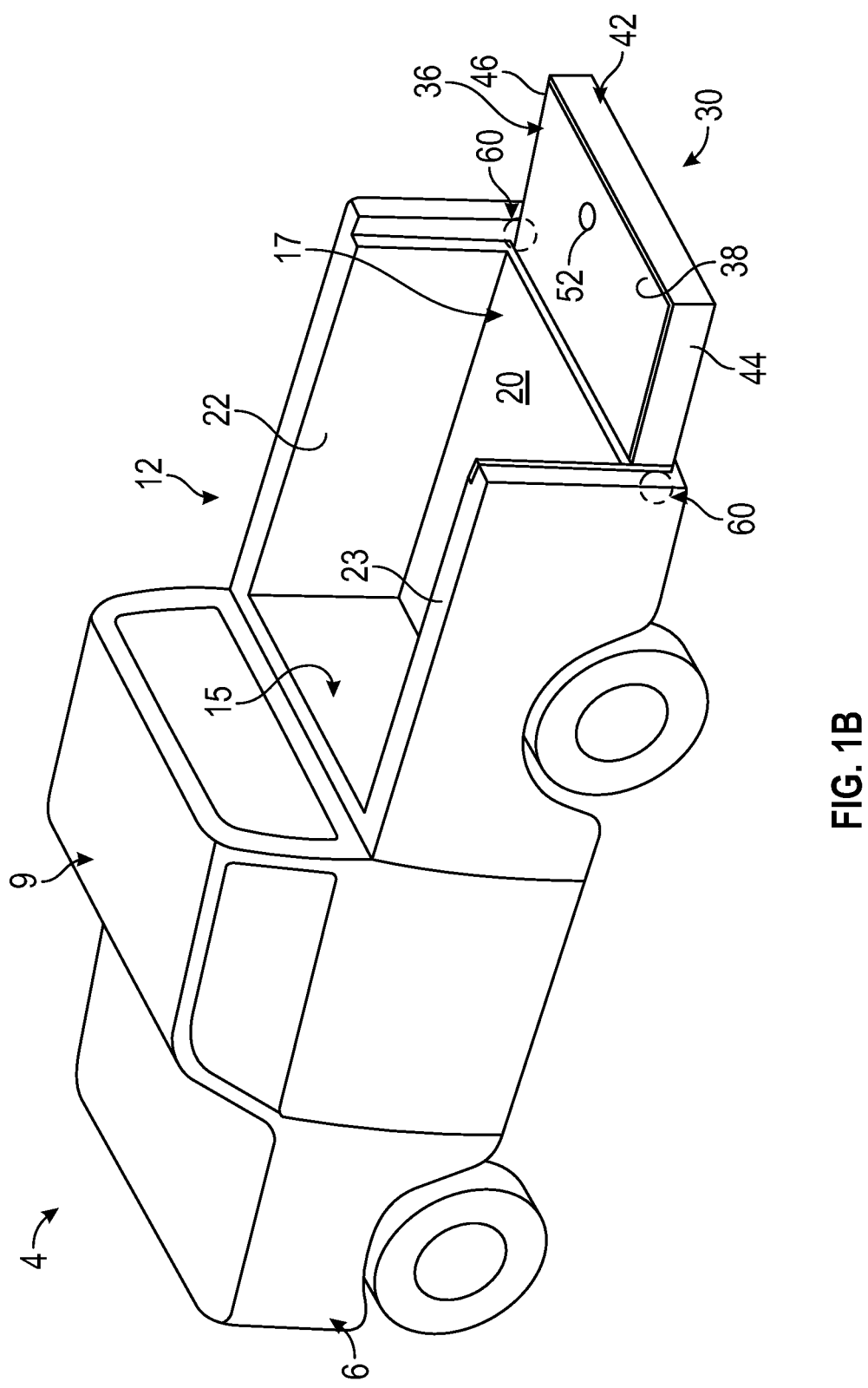
FIG. 1B is a perspective view of the vehicle of FIG. 1A depicting the end gate in a fully open configuration, in accordance with an exemplary embodiment.

Referring to FIGS. 1A and 1B, a motor vehicle such as a pickup truck, in accordance with an exemplary embodiment, is indicated generally at 4. Motor vehicle 4 includes a body 6 including a passenger compartment or cab 9. In the exemplary embodiment shown, motor vehicle 4 includes a cargo box 12 having a first end 15 arranged adjacent to cab 9, a second end 17, and a base portion 20 extending therebetween. Cargo box 12 also includes a first side wall 22 and an opposing second side wall 23. First and second side walls 22 and 23 extend between first end 15 and second end 17.

Cargo box 12 includes an end gate 30 pivotally mounted between first and second side walls 22 and 23 at second end 17. End gate 30 includes a body 36 having a first surface 38 an opposing second surface 40 and an end portion 42. End gate 30 further includes a first side portion 44 and a second side portion 46. End portion 42 extends between first and second side portions 44 and 46. End gate 30 is pivotally mounted to both the first and second side walls 22 and 23 via a hinge assembly 60 disposed on the first and second side portions 44 and 46 of the end gate 30.

End gate 30 includes a release mechanism 90 that is configured to interact with the hinge assembly 60. In one embodiment, as shown in FIG. 1A, the release mechanism 90 includes an end gate handle 50 disposed on the second surface 40 of the end gate 30. In another embodiment, as shown in FIG. 1B, the release mechanism 90 includes a button 52 disposed on the end gate 30. For example, on the first surface 38 or a side portion 44, 46 of the end gate 30. The release mechanism 90 selectively activates the binge assemblies 60 to permit movement of the end gate 30. The release mechanism 90 is partially enclosed within end gate 30 and includes an actuator or release element that extends from within end gate 30 through the first side portion 44 and the second side portion 46. The release mechanism 90 also includes a pawl that may selectively project through hinge assembly 60.

Referring now to FIGS. 2A, 2B, and 2C various views of an example hinge assembly 100 in accordance with an exemplary embodiment are shown. As illustrated, the hinge assembly 100 includes an attachment portion 110 that is configured to secure the hinge assembly 100 to the end gate. The attachment portion 110 includes a side member 112 and a bottom member 114 that each include apertures 116 that are configured to secure the attachment portion 110 to the end gate. The hinge assembly 100 includes a hinge body 118 that is connected to the attachment portion 110. In one embodiment, the hinge body 118 is integrally formed with the attachment portion 110. In another embodiment, the hinge assembly 100 can include the attachment portion 110, the side member 112, the bottom member and the hinge body 118 that have been welded together. The hinge body 118 includes an opening 115 that is configured to receive a positioning cam 124. The opening 115 includes an inner surface 113 that is configured to interact with the positioning cam 124 to limit the rotational movement of the positioning cam 124 inside of the opening 115.

The hinge assembly 100 also includes a hinge pin 120 that is connected to the positioning cam 124. In one embodiment, the hinge pin 120 is integrally formed with the positioning cam 124. The hinge pin 120 is configured to be secured to one of the side walls of the cargo box. In one embodiment, the hinge pin 120 includes an aperture 122 that is configured to receive a pin or bolt to secure the hinge pin 120 to the side walls of the cargo box. The hinge assembly 100 may also include a cover 150 that is configured to enclose the hinge body 118 and only allow the hinge pin 120 to protrude through the cover 150.

In one embodiment, the hinge assembly 100 further includes a control disc (not shown) that is disposed in the opening 115 of the hinge body 118. In one embodiment, the control disc is configured to rotate about the hinge pin 120. In one embodiment, the positioning cam 124 of the hinge assembly 100 is configured to facilitate the transition of the end gate from a closed position directly to a fully open position, without stopping at any intermediate positions between the closed and the fully open positions.

The hinge assembly 100 also includes a pawl 106 that is disposed within the opening 115 of the hinge body 118. The pawl 106 is connected to a release element 102, which is configured to control the movement of the pawl 106. In exemplary embodiments, the release element 102 is part of the release mechanism 90 shown in FIG. 1. In exemplary embodiments, the pawl 106 is configured to interact with one or both of the positioning cam 124 and the control disc to control the rotation of the hinge body 118 about the hinge pin 120. In one embodiment, the button 52 of the release mechanism 90 causes the pawl 106 to selectively disengage from positioning cam 124 when the end gate 30 is in one of the intermediate positions.

The hinge assembly is configured to permit the transition of the end gate from the closed position to one of a first intermediate position, a second intermediate position, and the open position. Furthermore, the hinge assembly is configured to permit the transition of the end gate from the first intermediate position to one of the second intermediate position, the fully open position, and the closed position. In one embodiment, in order to transition the end gate from the first intermediate position to the fully open position, the button 52 of the release mechanism 90 must be activated. Likewise, the hinge assembly is configured to permit the transition of the end gate from the second intermediate position to one of the first intermediate position, the fully open position, and the closed position. In one embodiment, in order to transition the end gate from the second intermediate position to either the first intermediate position or the fully open position, the button 52 of the release mechanism 90 must be activated. That is the end gate can be raised without activating the button 52 of the release mechanism 90 but in order to lower the end gate from either the first or second intermediate positions, the button 52 of the release mechanism 90 must be activated.

Figures 3A, 3B, 3C, 3D:
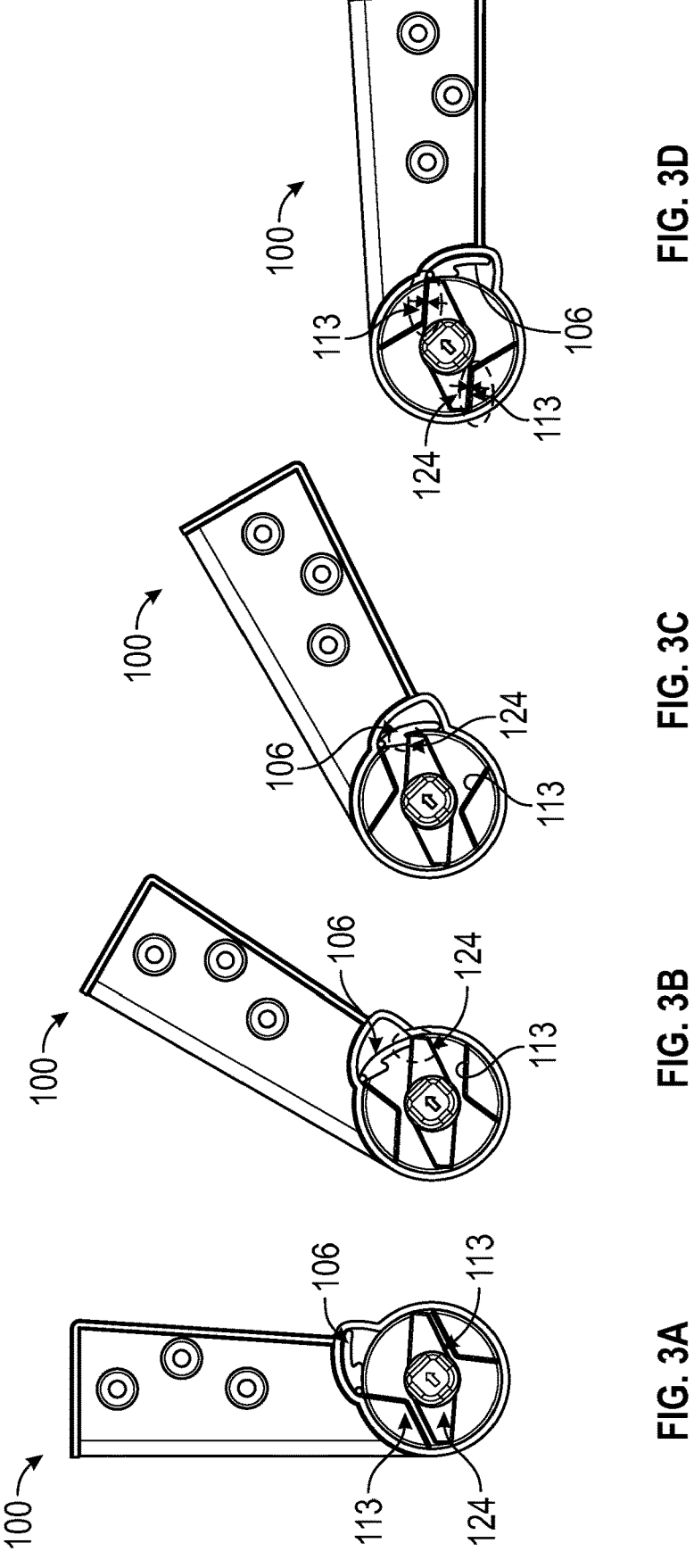
FIGS. 3A, 3B, 3C, and 3D are side views of an example hinge assembly in a closed position, a first intermediate position, a second intermediate position, and a fully open position, respectively, in accordance with an exemplary embodiment.

Referring now to FIGS. 3A, 3B, 3C, and 3D, side views of an example hinge assembly 100 in a closed position, a first intermediate position, a second intermediate position, and a fully open position, respectively, in accordance with exemplary embodiments are shown. As shown in FIG. 3A, when the hinge assembly 100 is in the closed position, the pawl 106 is not engaged with the positioning cam 124 and the positioning cam 124 has clearance to the inner surface 113 of the hinge body. As shown in FIG. 3D, when the hinge assembly 100 is in the fully open position, the pawl 106 is not engaged with the positioning cam 124 and the positioning cam 124 is in contact with an inner surface 113 of the hinge body. As shown in FIG. 3B, when the hinge assembly 100 is in a first intermediate position, the pawl 106 is engaged with the positioning cam 124 and the positioning cam 124 is not in contact with an inner surface 113 of the hinge body. As shown in FIG. 3C, when the hinge assembly 100 is in a second intermediate position, the pawl 106 is engaged with the positioning cam 124, and the positioning cam 124 is not in contact with an inner surface 113 of the hinge body.

In one embodiment, in the fully open position, shown in FIG. 3D, the angle between the base portion of the cargo box and the first surface of the end gate is approximately one hundred and seventy-seven degrees. In the closed position, shown in FIG. 3A, the angle between the base portion of the cargo box and the first surface of the end gate is approximately ninety degrees. In the first intermediate position, shown in FIG. 3B, the angle between the base portion of the cargo box and the first surface of the end gate is approximately one hundred and fifty degrees. In the second intermediate position, shown in FIG. 3C, the angle between the base portion of the cargo box and the first surface of the end gate is approximately one hundred and twenty degrees. In some embodiments, the hinge assembly may be configured to have additional intermediate positions and alternative open angle stops, not limited to angles disclosed herein.

Referring now to FIGS. 4A, 4B, 4C, 4D, and 4E, side views of an example hinge body 218 in various positions in accordance with exemplary embodiments are shown. As illustrated, the hinge body 218 includes a stop 217 disposed on the inner surface of the hinge body 218. The hinge body 218 also includes a pawl 206 that is pivotally mounted to the hinge body 218. The hinge body 218 further includes a positioning cam 224 and a control disc 230 configured to rotate within the hinge body 218. In one embodiment, the positioning cam 224 is affixed to, or internally formed with, a hinge pin 220 that protrudes from the hinge body 218. The hinge pin 220 is configured to be affixed to a side wall of a cargo box of a vehicle.

In one embodiment, the positioning cam 224 includes one or more recesses 227, 229 that each correspond to an intermediate location of the hinge body 218. As the positioning cam 224 rotates within the hinge body 218, the pawl 206 selectively engages the recesses to secure the relative positions of the hinge body 218 and the hinge pin 220, and by extension the relative position of the cargo box and the end gate. The positioning cam 224 includes an end portion 225 that is configured to contact stop 217 of the hinge body 218 when the hinge body 218 is in the fully open position, as shown in FIG. 4C.

In one embodiment, the positioning cam 224 includes a protrusion 226 that is configured to extend through a slot 232 of the control disc 230. The protrusion 226 and the slot 232 are configured to control the position of the control disc 230 through the cycling of the hinge. As shown in FIG. 4B, the positioning cam/gear 224 includes a first surface 231 that is configured to initially lift pawl 206 when the gate is closing. Control disc 230 would then engage the pin on pawl 206 that prevents the pawl 206 from engaging with the recesses 227, 229 of the positioning cam/gear 224 when the hinge body 218 transitions from a closed position, shown in FIG. 4A, to a fully open position, as shown in FIG. 4C. As the gate approaches full open, the protrusion 226 of the positioning cam/gear 224 reaches the end of the slot 232 of the control disc 230. As a result, the control disc 230 stops rotating. As the hinge body 218 and pawl 206 continue to the fully open position, the pawl pin slides off the control disc 230 surface and engages the positioning cam/gear 224.

Figures 4A, 4B, 4C:
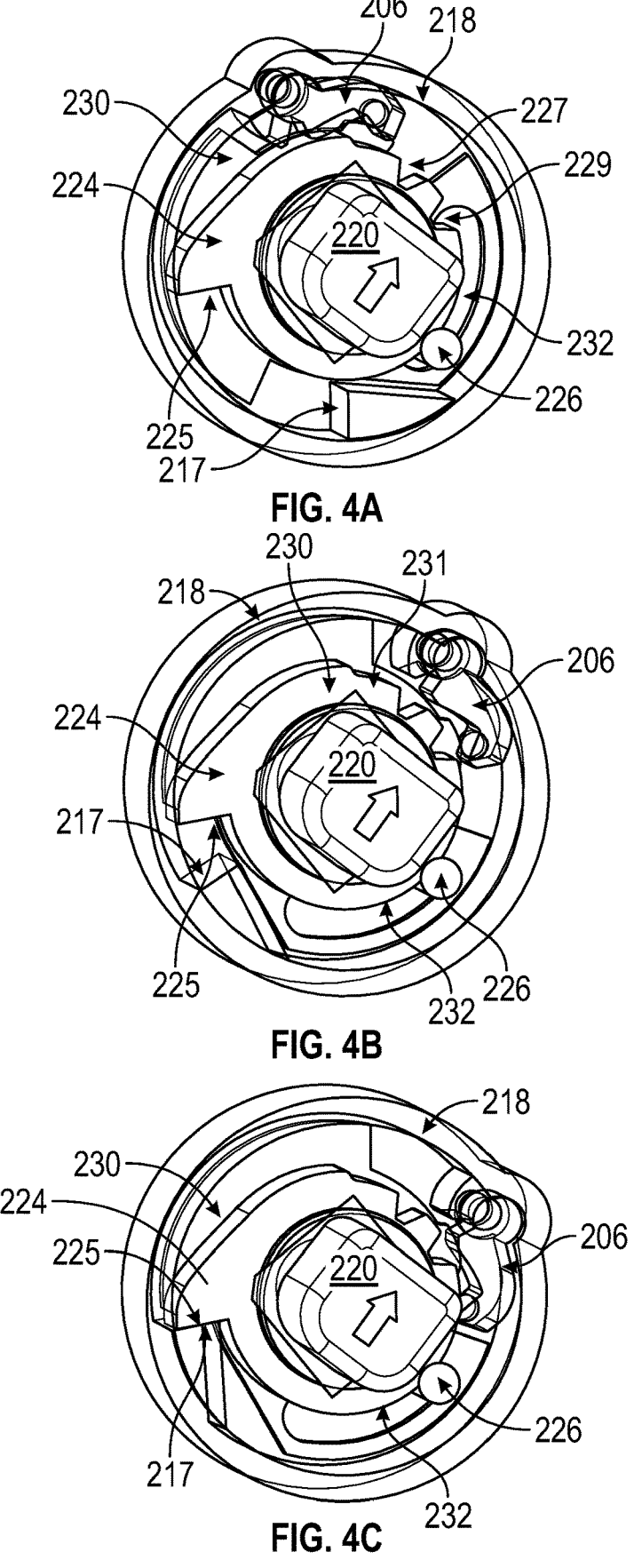
FIG. 4A is a side view of an example hinge assembly in a closed position in accordance with an exemplary embodiment.
FIG. 4B is a side view of an example hinge assembly transitioning from a closed position to a fully open position in accordance with an exemplary embodiment.
FIG. 4C is a side view of an example hinge assembly in a fully open position in accordance with an exemplary embodiment.
Figure 4D:
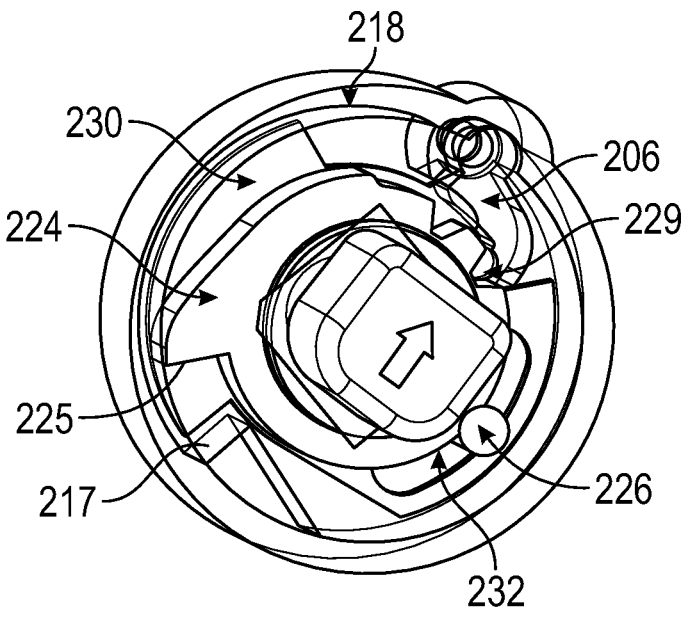
FIG. 4D is a side view of an example hinge assembly in a first intermediate position in accordance with an exemplary embodiment.
Figure 4E:
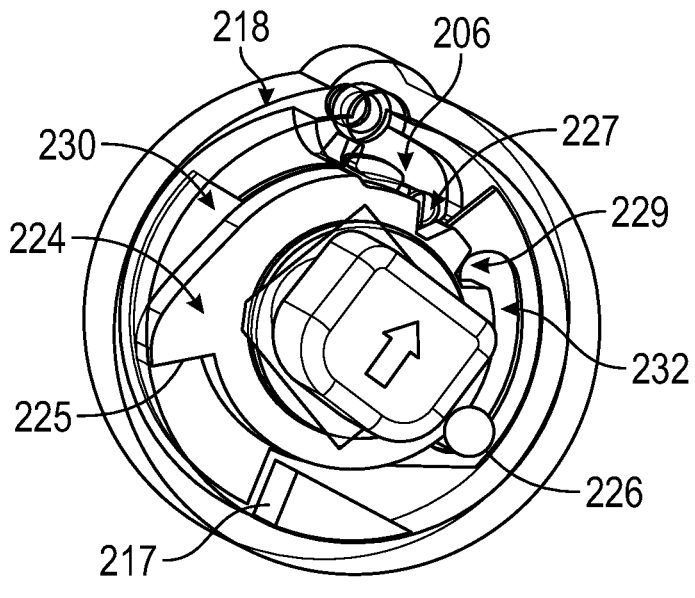
FIG. 4E is a side view of an example hinge assembly in a second intermediate position in accordance with an exemplary embodiment.

Once the hinge body 218 has reached the fully open position, as shown in FIG. 4C, the end portion 225 is configured to contact the stop 217 of the hinge body 218 to stop the rotation of positioning cam 224 within the hinge body 218 retaining the endgate in the open position. As the positioning cam 224 is rotated back towards the closed position, the control disc 230 maintains a fixed position relative to the positioning cam/gear 224 As the gate closes the pawl 206 is permitted to engage with recesses 227, 229 that correspond to intermediate positions, as shown in FIGS. 4D and 4E.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A cargo box for a pickup truck comprising:

a base portion including a first end, a second end, and an intermediate portion defining the cargo box;

a first side wall extending from the first end towards the second end on a first side of the cargo box, the first side wall including a first end portion;

a second side wall extending from the first end towards the second end on a second side of the cargo box, the second side wall including a second end portion; and an end gate having a first side portion, a second side portion, a surface extending between the first and second side portions, and an end portion, the end gate being pivotally mounted at the second end of the base portion by a pair of adjustable hinges, the end gate being disposed in one of a closed position wherein the end gate is linked to the first and second side walls, a first intermediate position wherein the end gate is arranged at a first angle relative to the base portion, and a fully open position wherein the end gate is arranged at a second angle, greater than the first angle, relative to the base portion, wherein the pair of adjustable hinges are configured to selectively retain the end gate in one of the first intermediate position and the fully open position, wherein each of the pair of adjustable hinges includes a hinge body having an opening that is configured to receive a positioning cam affixed to a hinge pin, a pawl disposed within the opening of the hinge body, and a control disc disposed in the opening and configured to rotate about the hinge pin, wherein the positioning cam includes one or more recesses that each correspond to an intermediate location of the hinge body and includes a protrusion that is configured to extend through a slot of the control disc, wherein the protrusion and the slot are configured to control the position of the control disc through the cycling of the hinge, and the control disc engages a pin on the pawl that prevents the pawl from engaging with the recesses of the positioning cam when the hinge body transitions from a closed position to a fully open position, and wherein, as the positioning cam rotates within the hinge body, the pawl selectively engages the recesses to secure the relative positions of the hinge body and the hinge pin and thereby retain the end gate in the first intermediate position and the fully open position.

2. The cargo box of claim 1, wherein the end gate is further capable of being disposed in a second intermediate position wherein the end gate is arranged at a third angle, greater than the first angle and less than the second angle, relative to the base portion.

3. The cargo box of claim 2, further comprising a release activation configured to permit the end gate to transition from the closed position directly to the fully open position.

4. The cargo box of claim 3, wherein the release activation is further configured to permit the end gate to transition from the first intermediate position to either the closed position or the fully open position.

5. The cargo box of claim 3, wherein the release activation is an end gate handle disposed on a second surface of the end gate.

6. The cargo box of claim 3, wherein the release activation is a button disposed on one of the first side wall and the second side wall.

7. The cargo box of claim 3, wherein in the fully open position an angle between the base portion of the cargo box and the first surface of the end gate is approximately one hundred and seventy-seven degrees, in the closed position the angle between the base portion of the cargo box and the first surface of the end gate is approximately ninety degrees, in the first intermediate position the angle between the base portion of the cargo box and the first surface of the end gate is approximately one hundred and fifty degrees, and in the second intermediate position the angle between the base portion of the cargo box and the first surface of the end gate is approximately one hundred and twenty degrees.

8. The cargo box of claim 1, wherein each of the pair of adjustable hinges includes a hinge pin that is affixed to one of the first side wall and the second side wall.

9. The cargo box of claim 1, further comprising a release activation configured to selectively engage the pawl with the positioning cam.

10. The cargo box of claim 1, wherein each of the pair of adjustable hinges further includes a cover configured to enclose the hinge body and allow only the hinge pin to protrude.

11. A vehicle comprising:

a body; and a cargo box mechanically connected to the body, the cargo box comprising:

a base portion including a first end, a second end, and an intermediate portion defining the cargo box;

a first side wall extending from the first end towards the second end on a first side of the cargo box, the first side wall including a first end portion;

a second side wall extending from the first end towards the second end on a second side of the cargo box, the second side wall including a second end portion;

an end gate having a first side portion, a second side portion, a surface extending between the first and second side portions, and an end portion, the end gate being pivotally mounted at the second end of the base portion by a pair of adjustable hinges, the end gate being disposed in one of a closed position wherein the end gate is linked to the first and second side walls, a first intermediate position wherein the end gate is arranged at a first angle relative to the base portion, and a fully open position wherein the end gate is arranged at a second angle, greater than the first angle, relative to the base portion, wherein the pair of adjustable hinges are configured to selectively retain the end gate in one of the first intermediate position and the fully open position, wherein each of the pair of adjustable hinges includes a hinge body having an opening that is configured to receive a positioning cam affixed to a hinge pin, a pawl disposed within the opening of the hinge body, and a control disc disposed in the opening and configured to rotate about the hinge pin, wherein the positioning cam includes one or more recesses that each correspond to an intermediate location of the hinge body and includes a protrusion that is configured to extend through a slot of the control disc, wherein the protrusion and the slot are configured to control the position of the control disc through the cycling of the hinge, and the control disc engages a pin on the pawl that prevents the pawl from engaging with the recesses of the positioning cam when the hinge body transitions from a closed position to a fully open position, and wherein, as the positioning cam rotates within the hinge body, the pawl selectively engages the recesses to secure the relative positions of the hinge body and the hinge pin and thereby retain the end gate in the first intermediate position and the fully open position.

12. The vehicle of claim 11, wherein the end gate is further capable of being disposed in a second intermediate position wherein the end gate is arranged at a third angle, greater than the first angle and less than the second angle, relative to the base portion.

13. The vehicle of claim 12, further comprising a release activation configured such that the end gate can be raised from the closed position directly to the fully open position without activating the release activation.

14. The vehicle of claim 13, wherein, in order to transition the end gate from either the first intermediate position or the second intermediate position to a lower position, the release activation must be activated.

15. The vehicle of claim 13, wherein the release activation is an end gate handle disposed on second surface of the end gate.

16. The vehicle of claim 13, wherein the release activation is a button disposed on one of the first side wall and the second side wall.

17. The vehicle of claim 13, wherein in the fully open position an angle between the base portion of the cargo box and the first surface of the end gate is approximately one hundred and seventy-seven degrees, in the closed position the angle between the base portion of the cargo box and the first surface of the end gate is approximately ninety degrees, in the first intermediate position the angle between the base portion of the cargo box and the first surface of the end gate is approximately one hundred and fifty degrees, and in the second intermediate position the angle between the base portion of the cargo box and the first surface of the end gate is approximately one hundred and twenty degrees.

18. The vehicle of claim 11, wherein each of the pair of adjustable hinges includes a hinge pin that is affixed to one of the first side wall and the second side wall.

19. The vehicle of claim 11, wherein the release activation is partially enclosed within the end gate and includes an actuator that extends through the first side portion and the second side portion.

20. A vehicle comprising:

a body; and a cargo box mechanically connected to the body, the cargo box comprising:

a base portion including a first end, a second end, and an intermediate portion;

a first side wall and a second side wall extending between the first end and the second end; and an end gate pivotally mounted at the second end of the base portion by a pair of adjustable hinges, wherein each adjustable hinge comprises:

a hinge body having an opening and an inner surface with a stop;

a positioning cam affixed to a hinge pin, the positioning cam disposed within the opening and including one or more recesses corresponding to intermediate positions and a protrusion;

a control disc disposed within the opening and configured to rotate about the hinge pin, the control disc including a slot that receives the protrusion; and a pawl disposed within the opening and having a pin, wherein, during a transition from a closed position to a fully open position, the control disc engages the pin on the pawl to prevent the pawl from engaging the recesses, and as the end gate approaches the fully open position the protrusion reaches an end of the slot and the control disc stops rotating, allowing the pawl pin to slide off the control disc and engage the positioning cam, wherein, in the fully open position, an end portion of the positioning cam contacts the stop on the hinge body to retain the end gate in the fully open position and as the positioning cam rotates within the opening, the pawl selectively engages the recesses to secure intermediate positions, wherein each adjustable hinge further includes a cover that encloses the hinge body and allows only the hinge pin to protrude, wherein the hinge pin includes an aperture configured to receive a pin or bolt to secure the hinge pin to one of the first side wall and the second side wall, and wherein the cargo box further comprises a release mechanism partially enclosed within the end gate and including an actuator that extends through the first side portion and the second side portion, such that the end gate can be raised from the closed position directly to the fully open position without activating the release mechanism, and to transition the end gate from either a first intermediate position or a second intermediate position to a lower position the release mechanism must be activated.

* * * * *